(12) United States Patent
Purdy

(10) Patent No.: US 9,713,236 B1
(45) Date of Patent: Jul. 18, 2017

(54) SOLID-STATE LIGHTING ARRANGEMENT WITH STARTUP DELAY CIRCUIT

(71) Applicant: ELB Electronics, Inc., Arcadia, CA (US)

(72) Inventor: Steven Purdy, Johns Creek, GA (US)

(73) Assignee: ELB Electronics, Inc., Arcadia, CA (US)

( * ) Notice: Subject to any disclaimer, the term of this patent is extended or adjusted under 35 U.S.C. 154(b) by 0 days.

(21) Appl. No.: 15/259,029

(22) Filed: Sep. 7, 2016

(51) Int. Cl.
*H05B 37/02* (2006.01)
*H05B 33/08* (2006.01)

(52) U.S. Cl.
CPC ..... *H05B 37/0281* (2013.01); *H05B 33/0887* (2013.01)

(58) Field of Classification Search
CPC ............ H05B 33/0815; H05B 33/0824; H05B 33/0803; H05B 33/0887; H05B 37/02; H05B 37/0281; H05B 41/36; F21Y 2103/00; F21Y 2113/00; F21Y 2115/10; Y02B 20/386

USPC ....... 315/56, 58, 209 R, 219, 297, 307, 312, 315/360
See application file for complete search history.

(56) References Cited

U.S. PATENT DOCUMENTS

| | | | | |
|---|---|---|---|---|
| 5,668,446 A | * | 9/1997 | Baker | H05B 37/02 315/158 |
| 8,858,019 B2 | * | 10/2014 | Novak | F21S 8/036 362/221 |
| 9,380,654 B2 | * | 6/2016 | Dankovits | H05B 33/0809 |
| 9,468,054 B2 | * | 10/2016 | Barnetson | H05B 33/0815 |

* cited by examiner

*Primary Examiner* — Haissa Philogene

(57) ABSTRACT

A solid-state lighting arrangement (10) designed for use within a lighting fixture (100) having existing ballast circuitry (110) for powering one or more discharge lamps. The solid-state lighting arrangement (10) includes a solid-state light source (50) and a startup delay circuit (60) coupled to light source (50). During operation, delay circuit (60) prevents application of power to light source (50) for a startup delay period, so as to provide compatibility with a wide variety of existing ballasts, as well as enhanced compatibility with the protection circuitry that is present in many existing ballasts.

10 Claims, 3 Drawing Sheets

SOLID-STATE LIGHTING ARRANGEMENT WITH STARTUP DELAY CIRCUIT

FIELD OF THE INVENTION

The present invention relates to lighting in commercial and residential environments, and more particularly to a solid-state lighting arrangement that is a drop-in replacement for conventional ballasted gas discharge lamps. This invention more particularly relates to a solid-state lighting arrangement that includes a startup delay circuit for providing greater compatibility with a wide range of existing lighting fixture & ballast combinations.

STATEMENT OF RELATED APPLICATIONS

The subject matter of the present application is related to that of pending U.S. patent application Ser. No. 14/644,111 (published as US 2015/0260384 A1), titled "FLUORESCENT LAMP FIXTURE WITH LEDS," and having the same inventor and same assignee as the present application. The full disclosure of that patent application is incorporated herein by reference.

BACKGROUND OF THE INVENTION

Due to advances in semiconductors and related technologies, light-emitting diodes (LEDs) have become so cost-effective as to make them feasible for lighting systems that previously relied upon incandescent or discharge lamps. Consequently, a substantial variety of LED-based replacement solutions have become available.

In the realm of household lighting, replacement of incandescent bulbs with bulbs that utilize LEDs has become commonplace. LED-based bulbs are still more costly than standard incandescent bulbs, but offer certain advantages, such as improved energy efficiency and much greater operating life.

In the realm of industrial lighting (e.g., factories and warehouses) and area lighting (e.g., office spaces and large residential spaces), the transition from conventional light sources to LED-based light sources has likewise proceeded at a fast pace. One of the major challenges has been the fact that many of those environments include large numbers of lighting fixtures which already include ballasts (magnetic and/or electronic) that are specifically designed for powering discharge lamps.

In recent years, many efforts have been directed to the challenge of providing LED-based light sources that are so-called "drop in" replacements for existing discharge lamps. These "drop-in" replacement LED-based light sources are commonly housed within a package resembling that of a conventional discharge lamp tube, and typically include a number of LEDs (arranged in various series, or series-parallel, combinations), along with associated circuitry, to functionally take the place of the discharge lamp(s) that they replace.

At least some of the existing LED-based replacements require, as a condition prior to installation, that the ballast(s) within the fixture at least be disconnected. As will be discussed in further detail herein, the need to disconnect the ballast(s) arises because of incompatibilities between the electrical requirements/behavior of the ballast(s) and those of the LED-based replacements. Disconnection of the ballast(s) involves laborious and costly rewiring and/or alteration of lighting fixtures, so that has been a significant impediment to the adoption of LED-based replacements.

There are some existing LED-based replacements that do not require disconnection of the ballast(s) within the fixture. Unfortunately, all known existing LED-based replacements are compatible with only a limited number of ballasts, and thus do not provide a "universal" retrofit solution. Additionally, as these existing replacements essentially introduce a capacitance in series with LEDs (so as to provide the impedance matching that is required for successful operation), that often leads to severe incompatibilities with ballasts which include certain types of protective circuitry; those incompatibilities usually result in the ballast either turning off (which keeps the LEDs from turning on in the first place) or, worse yet, turning off and on (which causes the LEDs to flash).

In contrast with what is required for powering LEDs, discharge lamps require ballasts in order to fulfill a number of essential functions that are particular to discharge lamps, the most essential of which are: (1) providing a high voltage for igniting the lamps; (2) providing a magnitude-limited source of current for properly operating the lamps; and (3) protecting the ballast circuitry from damage in the event of various fault conditions, such as what occurs due to wiring errors (e.g., output short-circuit conditions) or during times when the lamps themselves reach what are commonly referred to as "end of life" conditions.

Concerning the third ballast function (i.e, protecting the ballast circuitry from damage in the event of various fault conditions), it should be appreciated that LEDs exhibit an impedance characteristic that is quite different from that of discharge lamps. That difference is especially pronounced in the critical time period immediately following application of power. More specifically, LEDs exhibit a markedly lower impedance than discharge lamps, and that low impedance causes certain ballasts with advanced types of protection circuitry to preemptively shut down when the load is a LED-based replacement, instead of a particular type of discharge lamp for which the ballast was designed to power. The result is that no power is provided to the LEDs, since the ballast has shut down in response to a perceived output short condition. This is a serious problem which has yet to be fully resolved in the arts relating to LED-based replacements.

What is needed, therefore, is an improved drop-in replacement which does not require removal of existing ballasts; such a drop-in replacement should accommodate the fact that rewiring of the fixture is a substantial inconvenience and expense in applications for which substitution of discharge lamps with LED-based light sources would be an otherwise attractive alternative. A need also exists for a drop-in replacement that is compatible with a wide variety of existing ballasts, so as to provide a "universal" retrofit solution. A further need exists for a drop-in replacement which includes means for rendering it more fully compatible with ballasts that include protective circuitry for detecting and responding to short-circuit conditions in the initial period after the ballast first begins to operate. A drop-in arrangement with such means and advantages would represent a substantial improvement in the art.

DETAILED DESCRIPTION OF THE PREFERRED EMBODIMENTS

Figure 1:
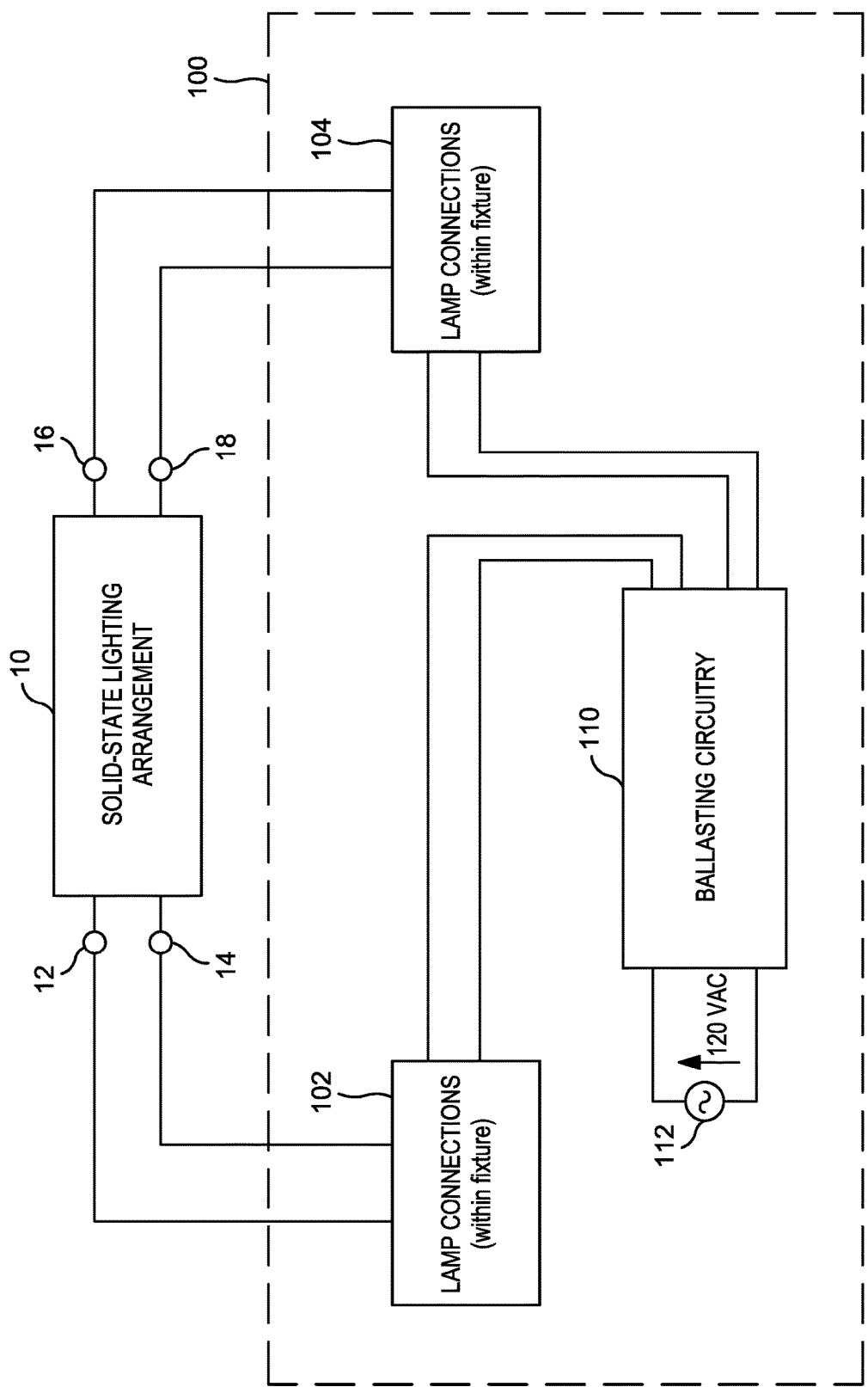
FIG. 1 is a block-diagram illustrating a solid-state lighting arrangement and a lighting fixture that includes a ballast.

FIG. 1 depicts a solid-state lighting arrangement 10 that is intended as a drop-in discharge lamp replacement for use within an existing lighting fixture 100.

As described in FIG. I, lighting fixture 100 includes lamp connections 102,104 (between which one or more lamps are usually connected) and ballasting circuitry 110 (which typically receives a conventional source 112 of AC power, such as 120 volts rms at 60 hertz).

During operation, ballasting circuitry 110 provides a suitable source of electrical power between lamp connections 102,104 for igniting and powering one or more discharge lamps. Moreover, ballasting circuitry 110 commonly includes protection means that are responsive to various output fault conditions, such as a short-circuit that may occur due to faulty wiring or degradation of electrical contacts with lighting fixture 100, and that may cause ballasting circuitry 110 to effectively shut down and thereby cease providing a useful source of electrical power between lamp connections 102,104. As will be appreciated in light of the full disclosure and comments herein, the presence of such protective means within ballasting circuitry 110 provides further motivation for the present invention.

Referring again to FIG. 1, solid-state lighting arrangement 10 has inputs 12,14,16,18 which are suitable for connection to lamp connections 102,104 within lighting fixture 100.

Figure 2:
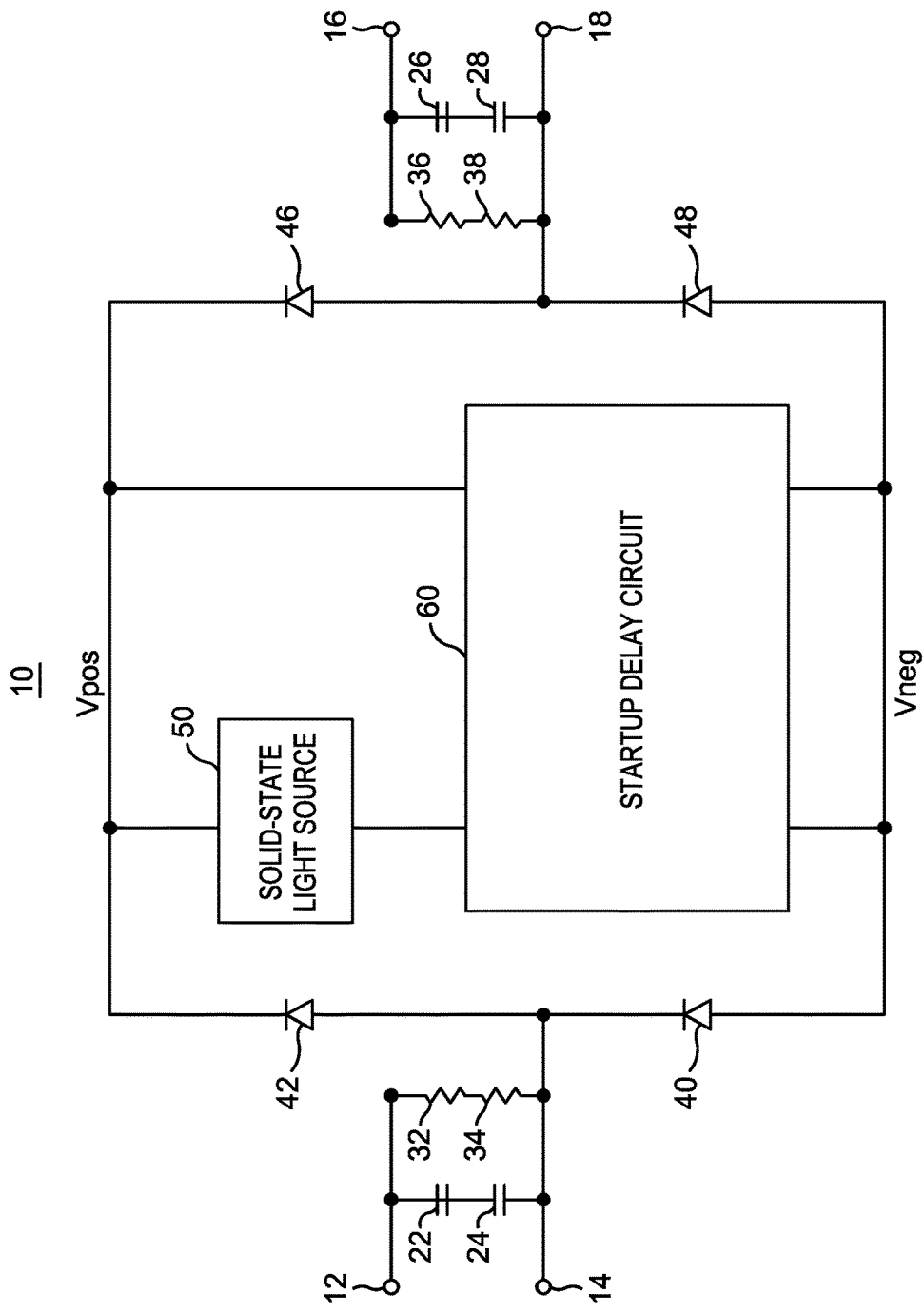
FIG. 2 is a block-diagram representation of a solid-state lighting system which includes a startup delay circuit, in accordance with a preferred embodiment of the present invention.

Turning now to FIG. 2, solid-state lighting arrangement 10 includes solid-state light source 50 and startup delay circuit 60. Solid-state light source 50 is operably coupled to inputs 12,14,16,18, and startup delay circuit 60 is coupled to solid-state light source 50. Preferably, and as illustrated in FIG. 2, solid-state light source 50 and startup delay circuit 60 are functionally coupled as a series combination between a positive voltage rail (Vpos) and a negative voltage (also referred to as a "common") rail (Vneg).

During operation, and upon initial appearance of electrical power at inputs 12,14,16,18 (which, as previously described with reference to FIG. 1, are coupled to ballasting circuitry 110 via lamp connections 102,104), startup delay circuit 60 prevents application of power to solid-stale light source 50 for at least a predetermined startup delay period (Tstart). Advantageously, this startup delay period effectively "rides out" any tendency of the protective means within ballasting circuitry to preemptively shut down in response to a perceived output short-circuit condition (which is attributable to the transient low-impedance characteristics of solid-state light sources) so as to allow solid-state light source 50 to be reliably powered. In this way, startup delay circuit 60 allows solid-state lighting arrangement 10 to serve as a drop-in replacement solution that provides substantially enhanced compatibility with existing lighting fixtures and ballasts, as compared with other approaches in the art.

Figure 3:
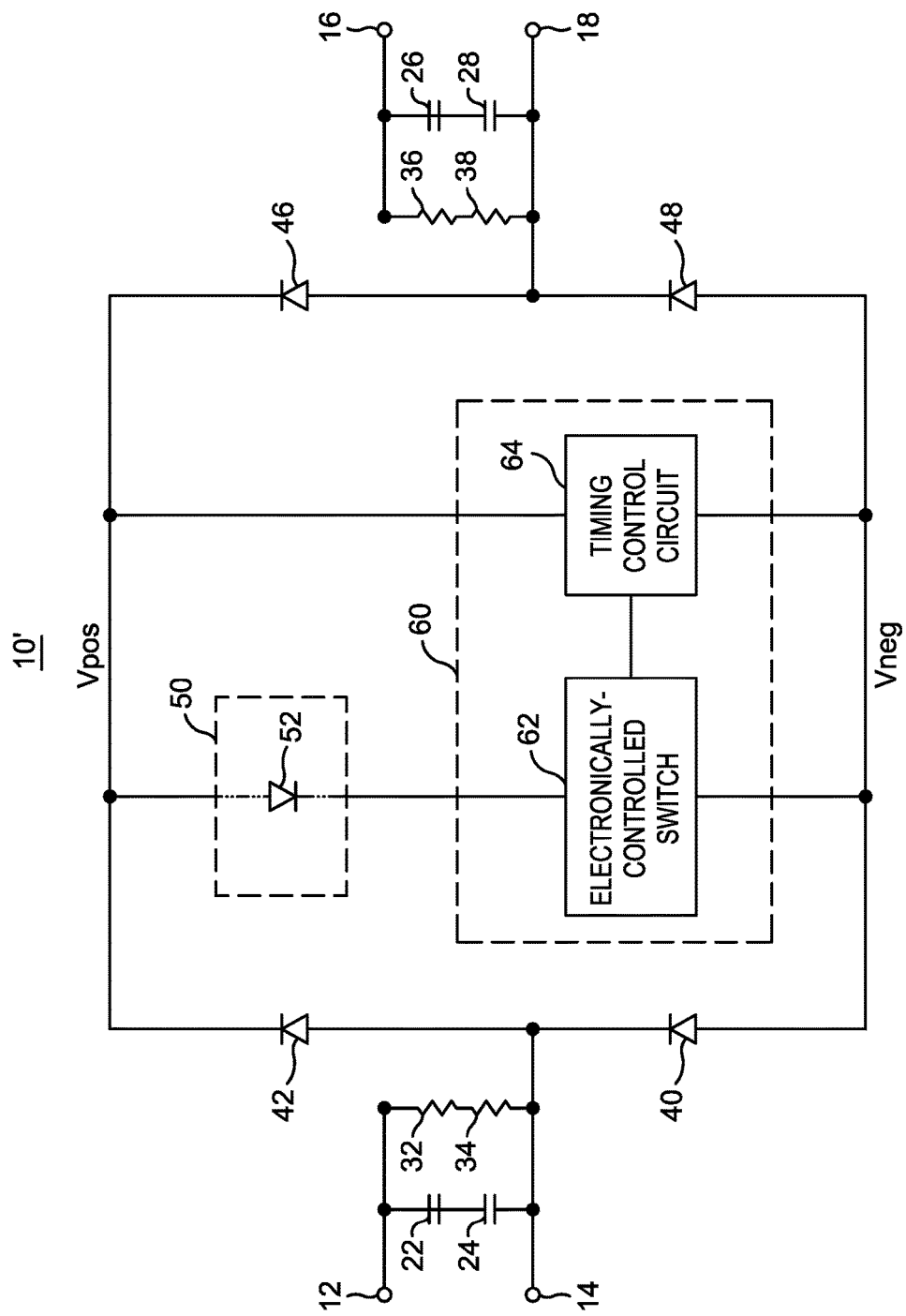
FIG. 3 is a more detailed block-diagram representation of a solid-state lighting system which includes a startup delay circuit, in accordance with a preferred embodiment of the present invention.

FIG. 3 describes a preferred solid-state lighting arrangement 10', in which the following preferred features are of note.

Solid-state lighting source 50 is preferably realized by a plurality of light-emitting diodes (LEDs), which is depicted in FIG. 3 by a single diode 52. It should be understood that in present practice, diode 52 is generally realized by multiple LEDs, connected in various series, or series-parallel combinations, depending upon the desired light output and power requirements of the particular LED-based replacement. While LEDs are currently the most cost-effective and well-developed solid-state components for realizing the present invention, it is contemplated that related solid-state technologies may develop in the future, for which the principles of the present invention may likewise be applicable.

As described in FIG. 3, startup delay circuit 60 is preferably realized as including an electronically-controlled switch 62 and a timing control circuit 64. Switch 62 is preferably coupled in series with light source 50. During operation, switch 62 turns on and allows application of electrical power to light source 50 only after the startup delay period (Tstart) has expired. It will be appreciated by those skilled in the art that, as a matter of practical electrical design, switch 62 can be realized by any of a number of suitable components, the most commonly preferred of which include a high-voltage power transistor or a relay.

Timing control circuit 64, which is coupled to switch 62, provides two key functions. First, timing control circuit 64 prevents switch 62 from turning on during at least the startup delay period (Tstart). This is very important, because fully depriving light source 50 from power during that delay period is essential to preventing an unwanted shut down of the ballasting circuitry. Secondly, following expiry of the startup delay period, timing control circuit allows switch 62 to turn on and allow power to be provided to light source 50, thereby allowing light-source 50 to provide the illumination that it is intended to provide.

It is further disclosed, as a highly preferred aspect of the present invention, that startup delay circuit 60 also provides the advantage of ensuring, after a momentary interruption in the electrical power at the inputs, followed by a restoration of power at the inputs, that power is not applied to light source 50 for at least the full duration of the startup delay period (Tstart).

To achieve the aforementioned highly preferred aspect, when a power interruption occurs, timing control circuit 64, operating in conjunction with switch 62, provides a reset function for quickly resetting delay circuit 60 before power is restored. As a practical matter, a finite amount of time (Treset) is required in order to reset delay circuit 60. Ideally, Treset should be very small, so as to completely ensure that delay circuit 60 is fully reset before power is restored; only in that way can it be guaranteed that switch 62 will remain off for the full duration of (as opposed to only a fraction of) the desired startup delay period. In this regard, Treset must be less than Tstart, and it is preferred that Treset should be much less than Tstart.

The preferred reset function is very important, because interruptions in the electrical power at the inputs are surprisingly common occurrences in lighting systems. These interruptions can occur in a number of ways. First, there is the reality of so-called "line drop-outs," wherein the AC power supplied by the electrical utility is momentarily interrupted. Second, it quite common for users of lighting systems to turn light switches on and off in rapid succession. Third, as is known to those skilled in the electrical engineering arts, electrical wall-switches are prone to the phenomenon of "switch bounce," which mimics the aforementioned behavior on a more microscopic scale.

As described in FIG. 3, solid-state lighting arrangement 10' includes a number of components which render arrangement 10' suitable for use with a fixture having preheat type ballasting circuitry that provides an AC output and that includes so-called filament detection circuitry. It should be understood, of course, that the principles of the present invention are not limited to ballasts of the preheat type, etc.

With reference to FIG. 3, the function of diodes 42,44, 46,48 is to provide full-wave rectification of the AC output from ballasting circuitry 110, as the preferred LED-based realization of light source 50 requires a unidirectional source of voltage in order to fulfill its intended functionality of allowing the LEDs within light source 50 of becoming forward-biased and thereby providing useful light. It is contemplated, however, that the disclosed arrangement may be used in conjunction with ballasting circuitry that provides a direct current (DC) output, in which case at least some of the components illustrated in FIG. 2 and FIG. 3 will not be required in order to practice the principles and advantages of the present invention.

With reference to FIG. 3, the function of resistors 32,34, 36,38 is provide current-sensing paths for filament detection circuitry within ballasting circuitry 110. Some ballasts include means for first verifying that filaments are intact before attempting to ignite or power the lamps, failing which the ballast will either shut down or enter a standby mode of operation. Resistors 32,34,26,38 are present in order to be accommodate that intended function.

With further reference to FIG. 3, the function of capacitors 22,24,26,28 is to suppress line-conducted electromagnetic interference (EMI), which is a common requirement that must be observed by many electronic devices.

Although the present invention has been described with reference to certain preferred embodiments, numerous modifications and variations can be made by those skilled in the art without departing from the novel spirit and scope of this invention.

What is claimed is:

1. A solid-state lighting arrangement for use within a lighting fixture having ballast circuitry for powering at least one gas discharge lamp, the arrangement comprising:
   inputs adapted for coupling to lamp connections within the lighting fixture;
   a solid-state light source operably coupled to the inputs; and
   a startup delay circuit coupled to the solid-state light source and operable, upon initial appearance of electrical power at the inputs, to prevent application of power to the solid-state light source for at least a startup delay period.

2. The arrangement of claim 1, wherein the startup delay period is on the order of about 5 milliseconds.

3. The arrangement of claim 1, wherein the startup delay period is on the order of about 100 milliseconds.

4. The arrangement of claim 1, wherein the startup delay period is selected to be in a range of between about 5 milliseconds and about 100 milliseconds.

5. The arrangement of claim 1, wherein the solid-state light source comprises a plurality of light-emitting diodes.

6. The arrangement of claim 1, wherein the startup delay circuit comprises:
   an electronically controlled switch coupled in series with the solid-state light source, and operable to turn on and allow application of electrical power to the solid-state light source following expiry of the startup delay period; and
   a timing control circuit coupled to the electronically-controlled switch, and operable to:
      (i) prevent the switch from turning on during at least the startup delay period; and
      (ii) allow the switch to turn on following expiry of the startup delay period.

7. The arrangement of claim 6, wherein the electronically-controlled switch comprises one of (i) a power transistor; and (ii) a relay.

8. The arrangement of claim 1, wherein the startup delay circuit is further operable, in response to a momentary interruption in the electrical power at the inputs, followed by a subsequent restoration of electrical power at the inputs, to prevent application of power to the solid-state light source for at the least full duration of the startup delay period.

9. The arrangement of claim 6, wherein the liming control circuit is further operable, in response to a momentary interruption in the electrical power at the inputs, followed by a restoration of electrical power at the inputs, to prevent the switch from turning on for at least the full duration of the startup delay period.

10. A solid-state lighting arrangement for use within a lighting fixture having ballast circuitry for powering at least one gas discharge lamp, the arrangement comprising:
   inputs adapted for coupling to lamp connections within the lighting fixture;
   a solid-state light source operably coupled to the inputs, wherein the solid-state light source comprises a plurality of light-emitting diodes; and
   a startup delay circuit coupled to the solid-state light source and operable, upon initial appearance of electrical power at the inputs, to prevent application of power to the solid-state light source for at least a startup delay period that is one the order of less than about one hundred milliseconds, wherein the startup delay circuit comprises:
      an electronically-controlled switch coupled in series with the solid-state light source, and operable to turn on and allow application of electrical power to the solid-state light source following expiry of the startup delay period; and
      a timing control circuit coupled to the electronically-controlled switch, and operable to:
         (i) prevent the switch from turning on during at least the startup delay period;
         (ii) allow the switch to turn on following expiry of the startup delay period; and
         (iii) in response to a momentary interruption in the electrical power at the inputs, followed by a restoration of electrical power at the inputs, to prevent the switch from turning on for at least the full duration of the startup delay period.

* * * * *